March 28, 1933.  E. KNIGHT  1,903,218
CHAIN BLOCK
Filed Aug. 31, 1931   3 Sheets-Sheet 1
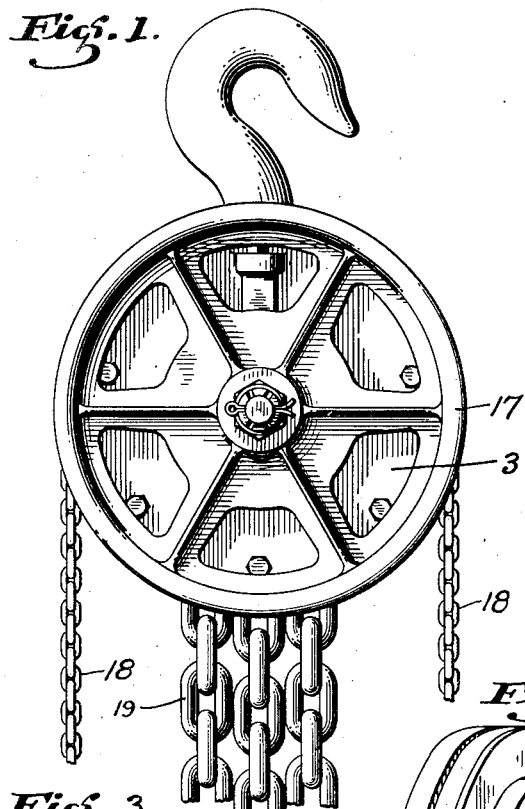
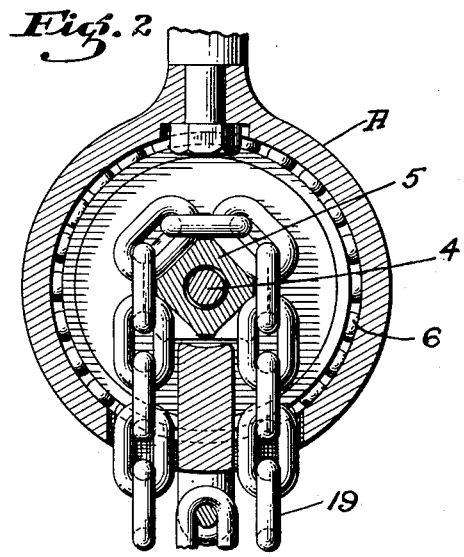
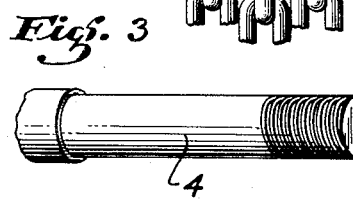
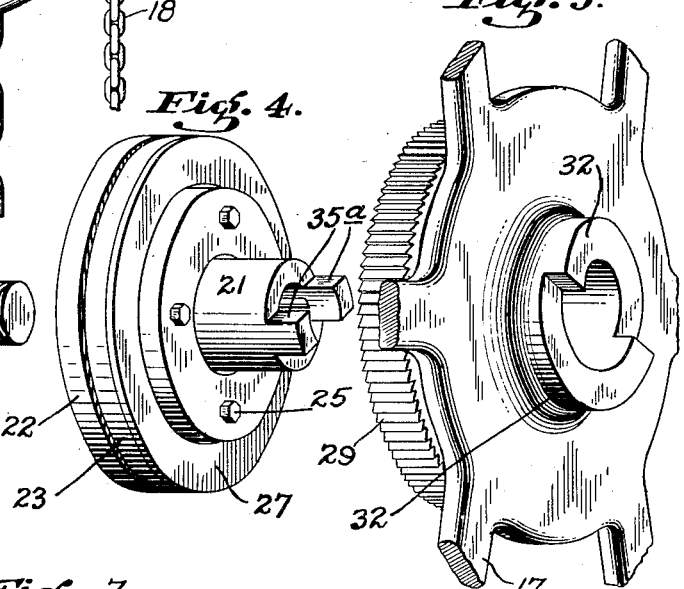
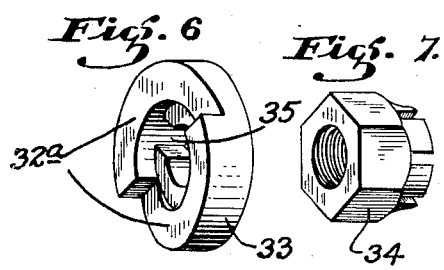
INVENTOR.
Elias Knight.
BY Townsend and Loftus.
ATTORNEYS.

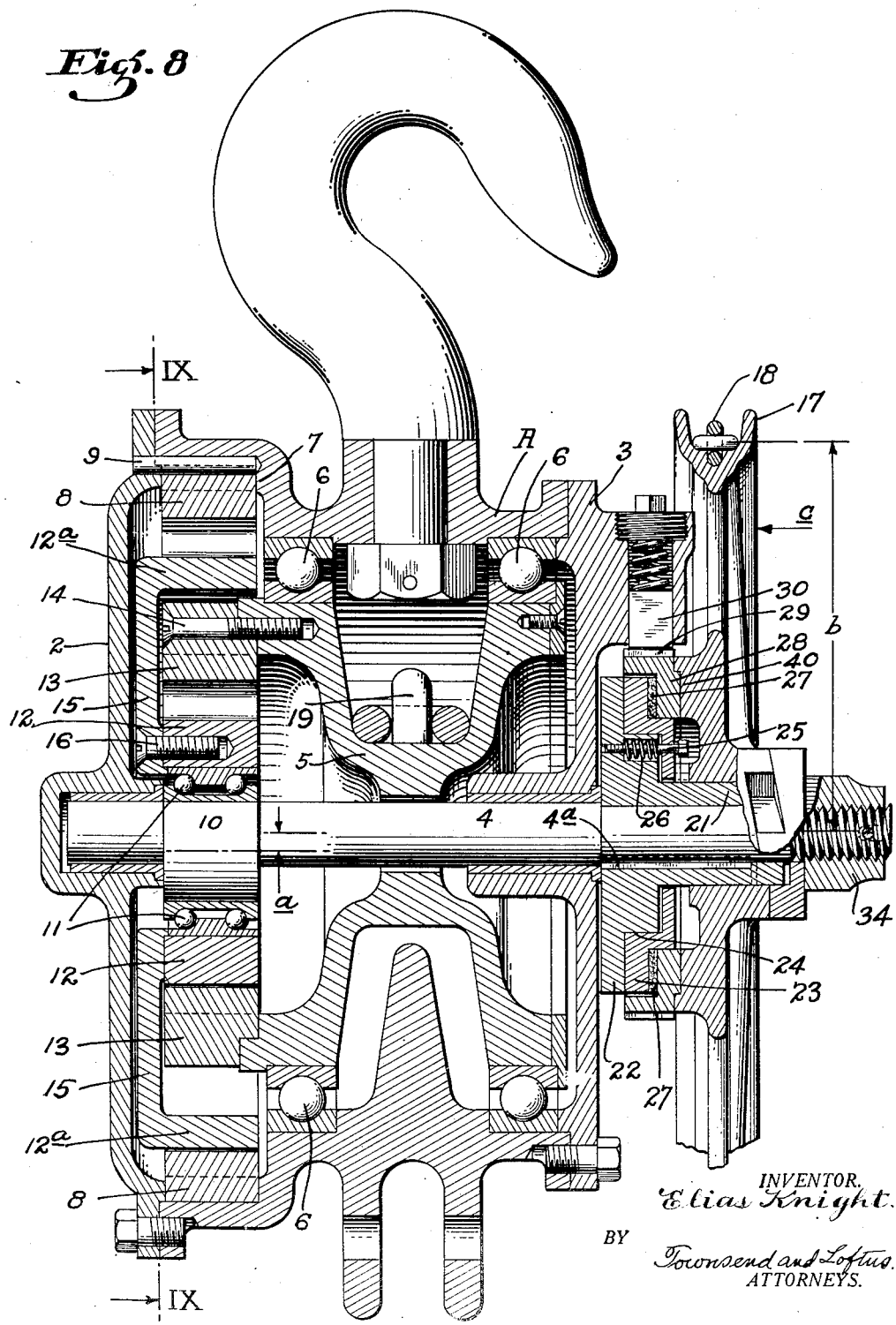

March 28, 1933.  E. KNIGHT  1,903,218
CHAIN BLOCK
Filed Aug. 31, 1931   3 Sheets-Sheet 3

INVENTOR.
Elias Knight
BY Townsend and Loftus.
ATTORNEYS.

Patented Mar. 28, 1933

1,903,218

UNITED STATES PATENT OFFICE

ELIAS KNIGHT, OF SAN FRANCISCO, CALIFORNIA

CHAIN BLOCK

Application filed August 31, 1931. Serial No. 560,387.

This invention relates to a chain block and particularly a chain block in which internal reduction gears, together with eccentric lever motion, is utilized to lift or lower a load.

The object of the present invention is to generally improve and simplify the construction and operation of chain blocks; to provide a chain block in which internal reduction gears, together with eccentric lever motion, is utilized to lift or lower a load; to provide friction actuated means whereby the load is automatically locked and held when raised; to provide friction actuated means whereby the load is gradually picked up and released when handling the same; to provide a chain block which is exceedingly compact and small in comparison to the loads capable of being handled; and, further, to provide a chain block in which the mechanism employed is reduced to a minimum number of parts and so arranged as to be substantially fool-proof and positive in operation.

The chain block is shown by way of illustration in the accompanying drawings, in which—

Fig. 1 is a side elevation of the same.

Fig. 2 is a central, vertical, cross section.

Fig. 3 is a perspective view of one end of the driving shaft.

Fig. 4 is a perspective view of the friction clutch.

Fig. 5 is a perspective view showing the hub portion and the ratchet gear carried by the pull chain sprocket.

Fig. 6 is a perspective view of the cam whereby the friction clutch is actuated.

Fig. 7 is a perspective view of the nut cooperating with the cam member shown in Fig. 6.

Fig. 8 is a central, vertical, longitudinal section through the chain block shown on a large scale.

Figure 9:
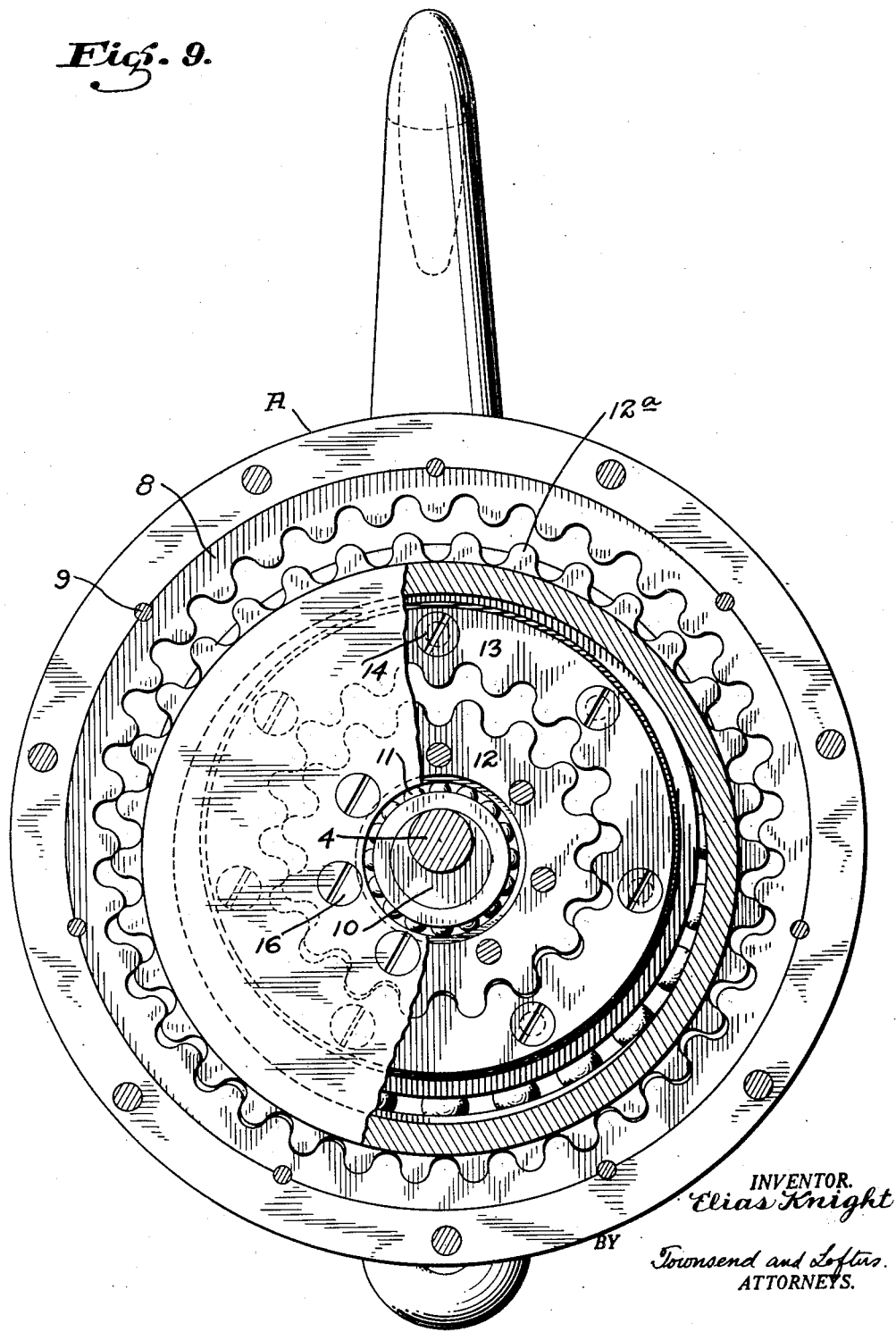
Fig. 9 is a cross section taken on line IX—IX of Fig. 8.

Referring to the drawings in detail and particularly Figs. 8 and 9, A indicates a housing which is substantially cylindrical in cross section. Disposed at opposite ends of the housing are head members indicated at 2 and 3 and journalled therein is a driving shaft 4. Mounted within the housing and centrally thereof is a hoisting chain sprocket 5 and supporting said sprocket so that it may be rotated independently of the drive shaft 4 are a pair of anti-friction bearings in the form of ball races or the like such as shown at 6. Secured between the head member 2 of the housing and an annular shoulder 7 is an internal gear 8. This gear is stationary and is secured first of all by the cover member 2 and secondly by keys or pins such as shown at 9. Formed integral with the shaft 4 or suitably secured thereto is an eccentric 10. Surrounding the same is an anti-friction bearing 11 and freely rotatable with said bearing is an external gear 12. This gear meshes with a second internal gear indicated at 13 and this gear is free to rotate in unison with the hoisting chain sprocket 5 as it is positively secured to one side thereof by means of screws 14. Meshing with the stationary internal gear 8 is an exterior gear 12a. This gear, together with the gear 12, is secured to rotate as a unit and the gear 12a is accordingly provided with an inwardly extending disc 15, which is secured to the gear 12 by means of screws 16.

By referring to Figs. 8 and 9, it will be noted that four gears are employed. First the stationary, rigidly secured internal gear 8; secondly the rotatable internal gear 13 which is secured to the chain sprocket 5; and third, the external gears 12 and 12a secured with relation to each other by means of the disc 15 and supported to freely rotate with relation to the eccentric 10 by means of the anti-friction bearing 11. Gears 12 and 13 are maintained in constant mesh, as will hereinafter be described, so are the gears 8 and 12a. In order to describe the operation of the gears, let it be assumed that a pull chain sprocket such as indicated at 17 is employed and that this is directly connected to the driving shaft 4. If this is the case, the pull chain sprocket is rotated through means of a pull chain of the ordinary type such as indicated at 18. When so rotated, shaft 4 will rotate and so will the eccentric 10 which is secured thereto. The gears 12 and 12a are supported by the eccentric and as the eccentric rotates a gyrating motion will be transmitted to the gears 12 and 12a. During such gyrating motion meshing of the gears 12, 13 and 12a and 8 takes place and as the gear 8 is stationary gears 12, 12a and 13 will be slowly rotated, the gear 13 rotating at the slowest speed. For instance, if the ratio of the teeth between the gears 8 and 12a is 36 and 34 and the ratio of the teeth between the gears 13 and 12 is 18 and 16, then it will be found that eighteen revolutions of the driving shaft 4 and eccentric 10 will cause one revolution of the gears 12 and 12a and 16/18 of a revolution of the gear 13, and as this gear is directly connected or secured to the chain sprocket 5 this will slowly rotate and the load applied to the hoisting chain indicated at 19 will be slowly raised or lowered depending upon the direction of rotation of shaft 4.

The load which the chain block is capable of lifting is not only proportional to the gear reduction obtained between the gears 8, 12, 12a and 13, but it is also proportional to the lever action obtained between the eccentric 10 and the pull chain sprocket 17. The eccentric presents a lever arm equal to the distance formed between the arrows a—a, see Fig. 8, for instance one-quarter of an inch, while the pull chain sprocket 17 presents a lever arm equal to the distance formed between the center of the shaft and the periphery of the sprocket 17 as indicated by the arrow b. If this distance is, for instance, twenty times the lever arm presented by the eccentric, or in other words five inches, then the leverage obtainable is twenty to one, hence the lift obtainable is first of all dependent upon the leverage provided and secondly upon the gear reduction employed, and as either may be as large as desired enormous loads may be lifted.

In actual practice it has been found desirable, particularly when handling heavy loads, to pick up and release the load gradually and slowly as it is possible in this manner to reduce the shocks and strains transmitted through the mechanism. With this object in view a friction drive has been formed between the pull chain sprocket 17 and the shaft 4. This is accomplished as follows: Keyed or otherwise secured on one end of the driving shaft 4 is a hub member 21 and formed thereon is a friction disc 22. Carried by said disc is a second cooperating friction disc 23, this disc being supported by an annular shoulder 24 and by bolts 25, the bolts forming a positive driving connection between the two discs. Springs, such as shown at 26, surround the bolts 25 and are interposed between the discs and their normal function is that of maintaining the clutch faces in contact. The outer face of the disc 23 is provided with an antifriction surface in the form of cork, leather, or the like, such as indicated at 27 and this is adapted to contact with the inner face of a ring 28 which is adapted to freely rotate on an annular shoulder formed on the friction disc 23. The outer surface of the ring 28 is provided with ratchet teeth 29, as shown in Figs. 5 and 8, and a pawl 30 carried by the head member 3 normally engages the teeth and as such secures the ring against rotation in one direction. The pawl is spring actuated and as such is always maintained in engagement with the teeth. Journaled to freely rotate on the hub member 21 is the pull chain sprocket gear 17. The outer end of the hub of this sprocket is provided with a pair of cam faces, such as shown at 32 in Figs. 5 and 8. A washer or collar 33, see Figs. 6 and 8, is provided with cooperating cam faces 32a and this collar is held on the shaft by means of a nut 34. The collar 33 is not only provided with the cam faces 32a but it is also provided with a pair of splined internal passages 35 to receive a pair of tongues or lugs 35a formed on the outer end of the hub member 21. The splined connection formed between the hub member 21 and the collar 33 causes these members to rotate in unison and it also causes rotation of these members in unison with the driving shaft 4 as the hub member 21 is keyed thereto as indicated at 4a. The friction discs 22 and 23 will also rotate in unison with the drive shaft, the hub 21, and the collar 26 as the disc 22 forms an integral part of the hub 21 and the only members which may rotate independently are the ratchet gear ring 28 and the pull chain sprocket 17.

The friction drive just described operates as follows: If it is desired to apply a load to the hoisting chain 19 and to raise the load, the chain 19 is passed about the load, hooked thereto or otherwise secured as in common practice, and when this is accomplished a pull is applied to the pull chain 18 so as to rotate the sprocket 17 in a clockwise direction. It was previously stated that the sprocket 17 was free to rotate on the hub member 21 and, as this is the case, rotation of the sprocket in a clockwise direction will cause the cam faces 32 and 32a to separate thereby forcing the sprocket 17 inwardly on the shaft 4 in the direction of arrow c, see Fig. 8. In so doing a friction face 40 formed on the sprocket is forced into frictional engagement with the ratchet ring 28 and this is, in turn, forced into frictional engagement with the friction face 27 of the friction disc 23, and continued rotation of the sprocket in a clockwise direction will cause the several faces to further frictionally engage and gradually pick up the load. That is, impart rotary motion to the discs 23 and 22, as the disc 22 is secured to the shaft 4 through the key 4a, shaft will be rotated and the chain sprocket 5 will rotate first through the lever action described and secondly through the gear reduction obtained through the gears 12, 13, 12a and 8 and the load will be lifted.

The friction mechanism just described, together with the ratchet ring and pawl 30, has another function, to-wit, that of automatically locking or holding the load when raised, hence when the load is lifted to the proper position or height desired the pull on the chain 18 is discontinued and the sprocket 17 is permitted to come to rest. Shaft 4 will under these conditions naturally tend to rotate in a reverse direction due to the load carried by the hoisting chain 19, but such rotational movement is automatically arrested as the pawl 30 engages the ratchet teeth and thus secures the ratchet ring against rotation. This in turn is frictionally secured with relation to the sprocket 17 and the friction discs 22 and 23 and shaft 4 is accordingly locked or held against reverse motion.

If it is desired to lower the load it is only necessary to reverse the direction of the sprocket 17 by pulling on the chain 18 in the direction which will cause the sprocket 17 to rotate in an anti-clockwise direction. In so rotating the sprocket 17, the cam faces 32 and 32a will approach each other thus reducing the friction between the several friction faces to a sufficient degree to permit the shaft 4 to rotate in a reverse direction and thereby lower the load. If the sprocket 17 is rotated fairly fast the load will be lowered proportionately fast but if it is slowly lowered the load will be slowly lowered as the load is purely frictionally released to the reverse rotation of the sprocket 17. It is due to this frictional release and pull that the load handled is gradually picked up and released, hence relieving the mechanism of all shocks and strains.

The anti-friction bearings employed reduce friction to a minimum; the number of parts employed are reduced to a minimum and as they are compactly arranged and rigid in construction it is obvious that enormous loads can be handled through means of a comparatively small chain block.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a chain block of the character described, a drive shaft, a friction clutch keyed to the shaft, spring means normally maintaining contact between the friction faces of said clutch, a pull chain sprocket rotatable with relation to the clutch and the shaft, and means whereby rotation of the sprocket in one direction is transmitted through the clutch to form a driving connection between the sprocket and the drive shaft and rotation of the sprocket in the opposite direction causes slipping of the friction clutch.

2. In a chain block of the character described, a drive shaft, a friction clutch keyed to the shaft, a pull chain sprocket rotatable with relation to the clutch and the shaft, a ratchet gear also rotatable with relation to the clutch and the drive shaft, means whereby rotation of the sprocket in one direction is transmitted through the friction clutch to form a driving connection whereby the drive shaft and the ratchet gear are driven in unison with the sprocket and rotation of the sprocket in the opposite direction frees the ratchet gear and causes slipping of the friction clutch, and a spring pressed pawl cooperating with the ratchet gear and automatically securing it against rotation in a reverse direction when rotated with the sprocket.

3. In a chain block of the character described, a drive shaft, a friction clutch comprising a disc keyed to the shaft, a second disc secured against rotation with relation to the first disc and having a clutch face, and springs interposed between said discs for normally maintaining said clutch face in engagement with a second clutch face, a pull chain sprocket rotatable with relation to the clutch and the shaft, a ratchet gear also rotatable with relation to the clutch and the drive shaft, a cam on the sprocket, a cooperating cam on the drive shaft, said cams moving the sprocket longitudinally on the drive shaft and forming a driving connection through the friction clutch to drive the drive shaft, the friction clutch and the ratchet gear in unison with the sprocket when this is rotated in one direction, said cams freeing the ratchet gear and causing slipping of the friction clutch when the sprocket is rotated in an opposite direction, and a pawl cooperating with the ratchet gear and automatically securing it against rotation in a reverse direction when rotated with the sprocket.

4. In a chain block of the character described a drive shaft, a friction clutch comprising a clutch element secured to the drive shaft, a second clutch element free to rotate with relation to the drive shaft, a driving sprocket rotatable on the drive shaft, means whereby rotation of the driving sprocket in one direction will move said clutch elements into clutching engagement, means whereby rotation of the sprocket in the other direction will release said clutching engagement and resilient means normally urging the clutch elements toward each other.

ELIAS KNIGHT.